(12) United States Patent
Lefebvre et al.

(10) Patent No.: US 8,034,441 B2
(45) Date of Patent: Oct. 11, 2011

(54) MULTILAYER COMPOSITION

(75) Inventors: Amy Lefebvre, Pottstown, PA (US); Robert Wanat, Langhorne, PA (US); Andrew Horvath, Philadelphia, PA (US); Donale Hone, Warrington, PA (US)

(73) Assignee: Arkema France, Colombes (FR)

( * ) Notice: Subject to any disclaimer, the term of this patent is extended or adjusted under 35 U.S.C. 154(b) by 1058 days.

(21) Appl. No.: 11/431,289

(22) Filed: May 10, 2006

(65) Prior Publication Data

US 2007/0009752 A1 Jan. 11, 2007

Related U.S. Application Data

(60) Provisional application No. 60/697,702, filed on Jul. 8, 2005.

(51) Int. Cl.
*A01K 1/015* (2006.01)
*B32B 7/02* (2006.01)
*B32B 5/16* (2006.01)
*B32B 17/10* (2006.01)
*B32B 27/32* (2006.01)

(52) U.S. Cl. ........ 428/221; 428/217; 428/323; 428/327; 428/339; 428/523

(58) Field of Classification Search .................... 525/276
See application file for complete search history.

(56) References Cited

U.S. PATENT DOCUMENTS

| | | | |
|---|---|---|---|
| 4,564,653 A | 1/1986 | Kamata et al. | |
| 5,270,387 A * | 12/1993 | Sheilds et al. | 525/71 |
| 5,312,575 A | 5/1994 | Wills | |
| 5,700,566 A * | 12/1997 | Muller et al. | 428/332 |
| 6,040,025 A | 3/2000 | Lorek | |
| 6,172,135 B1 | 1/2001 | Fraser et al. | |
| 6,316,527 B1 * | 11/2001 | Meyer et al. | 523/201 |
| 6,444,298 B1 | 9/2002 | Tadokoro et al. | |
| 6,444,311 B1 | 9/2002 | Friedman et al. | |
| 6,476,148 B1 | 11/2002 | Gross | |
| 6,482,893 B1 | 11/2002 | Kogowski et al. | |
| 6,525,135 B1 | 2/2003 | Nagata et al. | |
| 6,844,053 B2 * | 1/2005 | Koyama et al. | 428/220 |
| 6,908,670 B1 * | 6/2005 | Maekawa | 428/327 |
| 2001/0041256 A1 | 11/2001 | Heilmayr | |
| 2002/0123568 A1 | 9/2002 | Tajima et al. | |
| 2002/0136853 A1 | 9/2002 | Koyama et al. | |
| 2002/0177658 A1 | 11/2002 | Tajima et al. | |
| 2003/0216510 A1 | 11/2003 | Wanat et al. | |
| 2004/0023037 A1 * | 2/2004 | Baumert et al. | 428/421 |
| 2005/0233124 A1 | 10/2005 | Marot et al. | |
| 2006/0008642 A1 | 1/2006 | Marot et al. | |

FOREIGN PATENT DOCUMENTS

GB 2080199 A * 2/1982

*Primary Examiner* — David W Wu
*Assistant Examiner* — Elizabeth Eng
(74) *Attorney, Agent, or Firm* — Thomas F. Roland

(57) ABSTRACT

The invention relates to a multi-layer acrylic composition having at least two impact modified layers. The outer layer is an acrylic layer containing impact modifiers having a particle size of less than 225 nm, and the impact modifiers in the inner thermoplastic layer have a particle size of greater than or equal to 225 nm. The invention also relates to multi-layer composites having the multi-layer acrylic composition on one or both sides. The multi-layer acrylic composition can also include blends of acrylic and fluoropolymers.

18 Claims, 1 Drawing Sheet

FOREIGN PATENT DOCUMENTS

| | | |
|---|---|---|
| JP | 06179792 | 6/1994 |
| JP | 06179794 | 6/1994 |
| JP | 11147991 | 6/1999 |
| JP | 2003221421 | 8/2003 |
| JP | 2005200502 | 7/2005 |
| JP | 2006131803 | 5/2006 |
| WO | WO 88/01575 | 3/1988 |
| WO | WO 00/08098 | 2/2000 |

* cited by examiner

MULTILAYER COMPOSITION

This application claims benefit under U.S.C. §119(e) of U.S. provisional application 60/697702, filed Jul. 8, 2005.

FIELD OF THE INVENTION

The present invention relates to a multi-layer composition having at least two impact modified layers. The outer layer is an acrylic layer containing impact modifiers having a particle size of less than 225 nm, and the inner thermoplastic layer contains impact modifiers having a particle size of greater than or equal to 225 nm. The invention also relates to multi-layer composites having the multi-layer acrylic composition on one or both sides of a substrate. The acrylic composition can also include blends of acrylic and fluoropolymers.

BACKGROUND OF THE INVENTION

Acrylic compositions and articles made from them are well known for their clarity, sparkling color, surface gloss and weather resistance. They are also well known for their low-impact strength or brittleness. It has become standard practice to incorporate toughening agents or impact modifiers in acrylic formulations to make them more durable. The incorporation of such functional additives can, however, detract from some of the desirable characteristics of the acrylics, for example the addition of large quantities of rubbery polymers can lower the softening point, contribute to haze, and affect the weatherability.

One type of polymeric impact modifier is sequentially polymerized acrylic compositions comprising a core, an intermediate and a final stage, although there can be some intermingling of the "layers". In general, these are known as "core/shell" polymers.

There are many factors which determine the efficiency and utility of any specific acrylic core/shell impact modifier. These include the matrix in which it is used or the substrate to which the matrix it is adhered whether alone or as part of a capstock composition. Also highly influent are the particle size and distribution of the modifier, number of layers, the thickness and construction of each layer, the monomer composition of each layer, the type and degree of crosslinking of each layer, the type and degree of grafting, as well as the concentration of the sequentially polymerized core/shell impact modifier in the matrix or primary polymer. The matrix polymer or primary polymer as defined herein is the polymer which forms the bulk of the articles, such as acrylic sheet, or an extruded capstock. One such core/shell impact modified acrylic composition is described in US 2003-0216510.

One way to solve the problems associated with an impact modified layer exposed to the environment is to form a multi-layer structure having an impact modified acrylic layer covered with an acrylic layer containing no impact modifier. Such a structure is described in U.S. Pat. No. 6,444,298.

Some issues found with present multi-layer films are surface haze and delamination from substrates.

Surprisingly it has been found that a multi-layer acrylic composition, having an outer layer containing small hard-core impact modifiers, and an inner layer having larger size impact modifers presents an excellent balance of weatherability, chemical resistance, abrasion resistance, and gloss after thermoforming.

SUMMARY OF THE INVENTION

The invention relates to an acrylic multi-layer film or composition comprising from the outside in:
1) an outer layer comprising an acrylic resin and from 5 to 60 weight percent, based on the total outer layer composition, of a hard-core core/shell impact modifier having an average particle size of less than 225 nm;
2) an inner layer comprising a thermoplastic resin and from 4 to 60 weight percent, based on the total inner layer composition, of impact modifier having an average particle size of greater than 225 nm, wherein said hard-core core has a Tg of greater than 0° C.; and The invention also relates to a multi-layer composite structure, in which the acrylic multi-layer film is attached to one or more sides of a substrate.

The invention further relates to an article made from the multi-layer acrylic composition or from a multi-layer composite containing the acrylic composition.

DETAILED DESCRIPTION OF THE INVENTION

Figure 1:
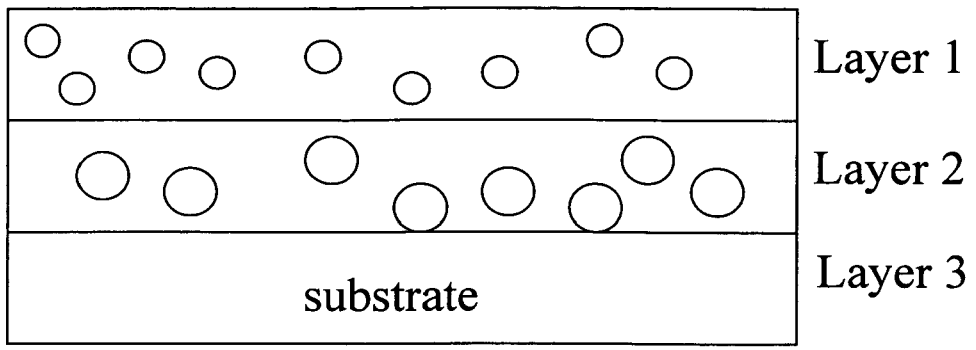
FIG. 1 is a diagram showing a typical multi-layer acrylic composition of the invention adhered to a substrate layer. Layer 1 is the outer acrylic layer with impact modifier average particle size of less than 225 nm. Layer 2 is the inner thermoplastic layer with impact modifier average particle size of greater than or equal to 225 nm. Layer 3 is a substrate onto which the multi-layer composition may optionally be applied.

The invention is to a multi-layer acrylic composition having at least two adjacent impact modified layers. The outer layer is an acrylic layer containing impact modifiers having an average particle size of less than 225 nm, and the impact modifiers in the inner thermoplastic layer have an average particle size of greater than or equal to 225 nm. The impact modified acrylic composition may be used over any substrate and provides excellent gloss and weatherability.

By "Multi-layer", as used herein, is meant two or more layers. The inner and outer acrylic layers, as described herein are adjacent to each other, and represent the outermost layers of the multi-layer composition. The multi-layer composition may be attached to a substrate to form a multi-layer composite structure.

By "Acrylic", as used herein, includes polymers, copolymers and terpolymers formed from alkyl methacrylate and alkyl acrylate monomers, and mixtures thereof. The alkyl methacrylate monomer is preferably methyl methacrylate, which may make up from 50 to 100 percent of the monomer mixture. 0 to 50 percent of other acrylate and methacrylate monomers or other ethylenically unsaturated monomers, included but not limited to, styrene, alpha methyl styrene, acrylonitrile, and crosslinkers may also be present in the monomer mixture. Other methacrylate and acrylate monomers useful in the monomer mixture include, but are not limited to, methyl acrylate, ethyl acrylate and ethyl methacrylate, butyl acrylate and butyl methacrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, dimethylamino ethyl acrylate and methacrylate monomers. Alkyl(meth) acrylic acids such as methyl acrylic acid and acrylic acid can be useful for the monomer mixture.

The acrylic matrix polymer is generally added to the composition as a separate component from the impact modifier, though the matrix could also be fully or partially formed by the dissociation of one or more of the outer layers of the impact modifier to become all or part of the acrylic matrix polymer.

The outer impact-modified acrylic layer, is the layer exposed to the environment. The outer layer has a thickness of from 25 microns to 2.5 mm, preferably from 50 microns to 500 microns. It was found that the use of small sized impact modifiers improves the ductility of the outer layer as compared to a non-impact modified acrylic. The impact modified acrylic also increases the thermal expansion coefficient of the outer layer to more closely match the thermal expansion coefficient in the inner layer. Further, a closer match between the outer and inner layer could provide for better compatibility/bonding between the layers.

The acrylic matrix polymer in the outer layer can be any acrylic homopolymer or copolymer, as defined above, or a blend thereof. The matrix can also be a blend of impact modified acrylic with other thermoplastics, such as polyvinylideneflouride (PVDF). Preferably, and required for a clear composition, the refractive index (RI) of the matrix and impact modifier are matched to be identical or nearly identical. The RI does not need to match if the outer layer does not need to be clear.

The impact modifier in the outer layer is present at from 5 to 60 weight percent, preferably 8 to 40 weight percent, and most preferably about 10-20 weight percent, based on the total weight of the outer layer. The impact modifier has a core-shell particle structure of at least three layers, having a hard core (Tg>0° C., preferably Tg>25° C., more preferably Tg>40° C.). The hard core can be a solid polymer with the Tg>0° C., but can also include the combination of a small amount of a low Tg seed on which the hard core is formed. For example, a small 5% rubber core seed that becomes dispersed into a hard core would be included in the invention as a hard core, as long as the combination behaves as a hard core. In one embodiment the core is a crosslinked polymethylmethacrylate—ethylacrylate copolymer, the middle layer is a crosslinked polybutylacrylate-styrene copolymer, and the outer shell is a polymethylmethacrylate-ethylacrylate copolymer.

The impact modifier in the outer layer has an average particle size of less than 225 nm, and preferably from 50 to 200 nm. The smaller size of the impact modifier, compared to typical 3-layer impact modifiers, enables the outer layer to retain its gloss after thermoforming. An outer acrylic layer having hard core impact modifiers with a particle diameter of greater than or equal to 225 nm at the same loading level show a poor gloss retention after thermoforming.

The inner layer is an impact modified thermoplastic polymer and is adjacent to the outerlayer. By adjacent is preferably meant that the inner and outer layer are directly in contact with each other, though a thin adhesive layer could be used to bond the two adjacent layers together. The inner thermoplastic polymer matrix includes, but is not limited to, polycarbonate, polyester, polystyrene, styrene/acrylonitrile copolymer, polyolefins, poly(vinyl chloride), chlorinated poly(vinyl chloride), imidized acrylic polymer, or an acrylic polymer. A preferred inner layer is an acrylic polymer. The acrylic polymer matrix can be any acrylic homopolymer or copolymer, as defined above, or blends thereof. The inner acrylic matrix polymer may be the same or different than the matrix of the outer acrylic matrix polymer. The refractive index of the polymer matrix and impact modifier should be matched for a clear layer, in many cases a clear layer is not required for the inner layer, and therefore there would be no requirement for a refractive index match.

The primary function of the impact modifier in the inner layer is to improve the impact properties of the inner layer. The impact modifiers used in the inner layer have an average particle size of greater than or equal to 225 nm, and preferably 250-350 nm. The larger particles are known to provide better impact properties than smaller particles. The impact modifier in the inner layer may be similar in composition to that used in the outer layer, or they may be of other compositions. In one embodiment the core is a crosslinked polymethylmethacrylate—ethylacrylate copolymer, the middle layer is a crosslinked polybutylacrylate-styrene copolymer, and the outer shell is a polymethylmethacrylate—ethylacrylate copolymer.

The impact modifier in the inner layer is present at between 4-60 weight percent, and preferably 20-45 weight percent, based on the weight of the inner layer. The thickness of the inner layer can be very broad, and is preferably between 50 microns and 2.5 cm.

The impact-modified inner and outer layers may further contain other additives typically present in acrylic formulations, including but not limited to, stabilizers, plasticizers, fillers, coloring agents, pigments, antioxidants, antistatic agents, surfactants, toner, refractive index matching additives, and dispersing aids.

In one embodiment of the invention, one and preferably both of the impact-modified layers are blends of an impact-modified acrylic polymer with a fluoropolymer. In one embodiment of such blends the outer layer will contain greater than 50 percent by weight of a fluoropolymer such as polyvinylidene fluoride (PVDF) blended with the impact modified outer layer, and the inner layer will have greater than 50 percent by weight of the inner impact modified acrylic blended with the fluoropolymer. Descriptions of the PVDF/acrylic blends can be found in U.S. Pat. Nos. 5,256,472 and 6,811,859, incorporated herein by reference.

The multi-layer composition is formed by any means known in the art. In one embodiment the inner and outer layers are formed separately into sheets or films and then laminated by means such as lamination continuously between heated rolls, heat-compressed in a press, or by lamination with an adhesive layer inserted between the two layers. In a preferred embodiment the multi-layer acrylic composition is manufactured by coextrusion or by laminating a film onto a melt.

Figure 3:
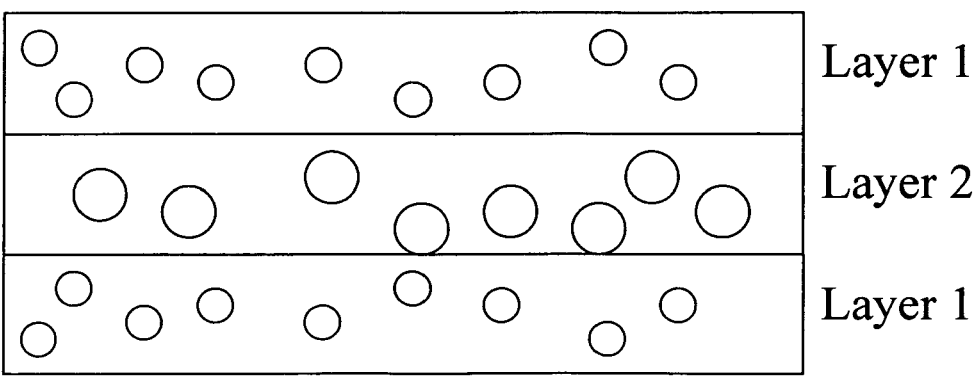
FIG. 3 is a diagram showing the multi-layer acrylic composition in which the outer Layer 1 is on both sides of the inner Layer 2.

In another embodiment, as illustrated in FIG. 3, the multi-layer composition has an inner layer with outer acrylic layers on both sides.

Figure 2:
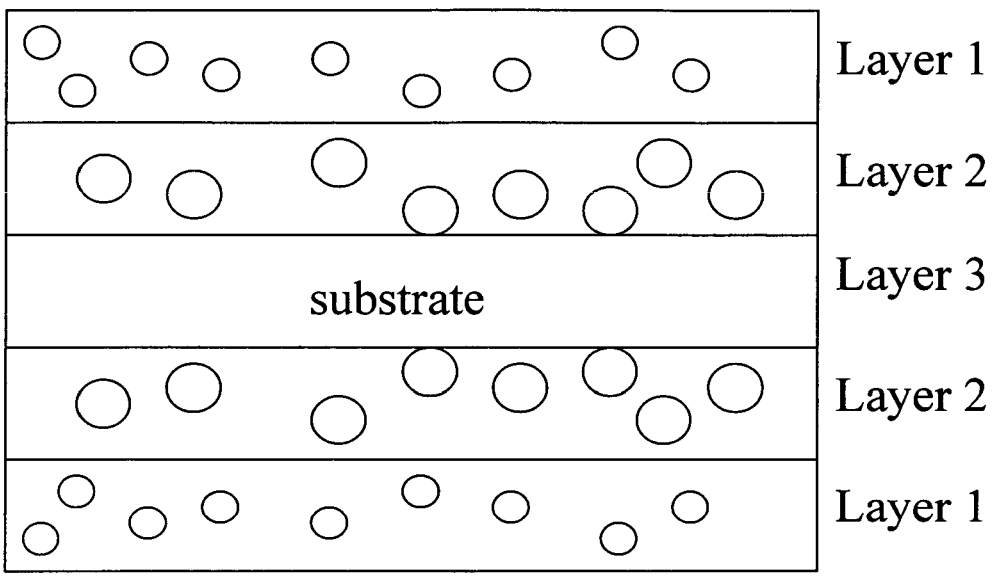
FIG. 2 is a diagram showing the multi-layer acrylic composition of the invention attached to both sides of a substrate.

The multi-layer impact modified acrylic composition may be bonded to one or more surfaces of a substrate to form a multi-layer composite structure. FIG. 1 illustrates the multi-layer acrylic film of the invention on a single side of a substrate, and FIG. 2 illustrates a multi-layer composite having the multi-layer acrylic composition on two sides of the substrate.

The substrate can be almost any substrate, with preferred substrates including, but not limited to plastics, metal, wood, glass, and stone. The substrate could be a single layer, or could itself contain multiple layers. Preferred plastic substrates include polyacrylonitrile-butadiene-styrene, polyacrylonitrile-styrene-acrylic, polycarbonate/polyacrylonitrile-butadiene-styrene, high impact polystyrene, polyvinyl chloride, thermoplastic olefins, polyolefins, polystyrene, polystyrene-acrylonitrile, polycarbonate, polyethylene terephthalate, and glycolised polyester.

The multi-layer composite may be formed by a multi-extrusion process in the case of a thermoplastic substrate. Different coextrusion processes and processing conditions can be found in D. G. Baird, D. I. Collais, *Polymer Processing* (John Wiley & Sons, Inc., New York, N.Y., 1998). The multi-layer composite may also be formed by lamination of the multi-layer composition onto the substrate, and by the use of an adhesive to bond the multi-layer composition to the substrate.

The multi-layer acrylic composition, or multi-layer composite may be used as a flat sheet or formed into other products by means known in the art, such as in-mold decorating, blow molding, sheet forming, coextrusion, profile extrusion, and thermoforming.

Some examples of products that can be formed from the multi-layer acrylic composition and/or the multi-layer composite of the invention include, but are not limited to: spas; counter tops; sinks; bathtub liner and surrounds; automotive and other vehicle components, including all-terrain and recreational vehicle components, such as body panels, tire covers, tonneau covers, cargo boxes, fender skirts, fifth wheel covers, lawn tractor components; engine surround covers; boat hulls; computer housings; cell phone casings; and as a replacement for metal cladding in appliances such as washing machines, refrigerators, and dishwashers.

The following examples are intended to illustrate further various aspects of the present invention, but are not intended to limit the scope of the invention in any aspect.

EXAMPLES

Examples 1

Formation of Resin for Outer Layer

A high gloss surface is very smooth and therefore reflects light only in the specular direction. However, reflected light from a rough surface will not only occur in the specular direction but will also occur at wider angles resulting in a surface that has a hazy appearance. One factor that can cause a hazy surface appearance is the presence of large size particles on or near the surface. Large size particles can protrude further out of a surface and cause greater variations in surface height than smaller particles.

An example of this phenomena is shown in Table 1. For this experiment, two impact modified acrylic samples containing 42 wt % impact modifier were injection molded to obtain high gloss plaques. The gloss of the plaques at a 60° angle was measured before thermoforming. The plaques were then thermoformed at 350 deg F. on a female mold with a draw down ratio between 3:1 and 4:1. After the samples cooled to room temperature the gloss at 60° was measured again. As can be seen in the table, the sample containing the 175 nm diameter impact modifiers had significantly higher gloss retention than the sample containing 300 nm diameter impact modifiers. This data clearly shows that the presence of particles with a smaller size, in this case 175 nm diameter particles, has a much smaller effect on surface haze than particles with a larger size.

TABLE 1

| Sample | Modifier Particle Size* | Modifier wt % | Gloss (60°) before thermoforming | Gloss (60°) after thermoforming | Gloss (60°) delta gloss | Gloss retention, % |
|---|---|---|---|---|---|---|
| 1 | 175 nm | 42 | 85.4 | 75.8 | −9.6 | 89 |
| 2 | 300 nm | 42 | 85.1 | 52.2 | −32.9 | 61 |

*Volume-average diameter measured by Dynamic Light Scattering

Example 2

Excellent gloss retention is also achievable for a multi-layer composite composition. In this experiment, a three layer composite sheet was coextruded. Table 2 lists the composition of each layer.

TABLE 2

| | Composition Layer 1 | | | Composition Layer 2 | | | Composition Layer 3 material |
|---|---|---|---|---|---|---|---|
| Sample | Modifier Particle Size* | Modifier wt % | acrylic wt % | Modifier Particle Size* | Modifier wt % | acrylic wt % | |
| 3 | 175 nm | 11 | 89 | 300 nm | 40 | 60 | ABS |

The thickness of layers 1, 2, and 3 were 0.010", 0.012", and 0.080", respectively. Using a table saw the three-layer sheet was cut into three 13"×13" squares. The gloss at a 20° angle of each sample was measured before thermoforming. The samples were then thermoformed at 320° F. After the samples cooled to room temperature the gloss at 20° was measured again. The average gloss before and thermoforming, the change in gloss, and the gloss retention for three samples listed in Table 3. This data demonstrates that excellent gloss retention after thermoforming s achieved for this multi-layer composite composition.

TABLE 3

| Sample | Gloss (20 deg) before thermoforming | Gloss (20 deg) after thermoforming | Gloss (20 deg) delta gloss | Gloss retention, % |
|---|---|---|---|---|
| 3 | 78.9 | 76.9 | −2.0 | 98 |

What is claimed is:
1. An acrylic multi-layer article comprising from the outside in:
 a) an outer layer comprising an acrylic polymer matrix and from 5 to 60 weight percent, based on the total outer layer composition, of a hard-core core/shell impact modifier having an average particle size of less than 225 nm, wherein said hard-core has a Tg of greater than 0° C.; and
 b) an inner layer comprising a thermoplastic acrylic polymer matrix and from 4 to 60 weight percent, based on the total inner layer composition, of core/shell impact modifier having an average particle size of greater than or equal to 225 nm,
 c) a substrate
 wherein layer a) is directly above and adjacent to layer b), and layer b is above and directly adjacent to said substrate.
2. The acrylic multi-layer article of claim 1 wherein said hard-core has a Tg of greater than 25° C.

3. The acrylic multi-layer article of claim 1 wherein said hard-core has a Tg of greater than 40° C.

4. The acrylic multi-layer article of claim 1 wherein said acrylic polymer matrix in the outer layer comprises from 50 to 100 percent by weight of methyl methacrylate monomer units.

5. The acrylic multi-layer article of claim 1 wherein said thermoplastic polymer is an acrylic polymer matrix and comprises from 50 to 100 percent by weight of methyl methacrylate monomer units.

6. The acrylic multi-layer article of claim 1 wherein said inner thermoplastic layer is an acrylic polymer matrix and wherein the acrylic polymer matrix in the inner and outer layers is the same.

7. The acrylic multi-layer article of claim 1 wherein said acrylic polymer matrix in the inner and outer layers is different.

8. The acrylic multi-layer article of claim 1 wherein said acrylic polymer matrix at least one of the inner or outer layers is a blend of a fluoropolymer and an impact modified acrylic polymer.

9. The acrylic multi-layer article of claim 1 wherein said outer layer has a thickness of from 2.5 microns to 2.5 mm.

10. The acrylic multi-layer article of claim 1 wherein said inner layer has a thickness of from 25 microns to 2.5 cm.

11. The acrylic multi-layer article of claim 1 wherein said outer layer comprises from 8 to 40 weight percent, based on the total outer layer composition, of said hard-core core/shell impact modifier.

12. The acrylic multi-layer article of claim 1 wherein said impact modifier in the outer layer has an average particle size of from 50-200 nm.

13. The multi-layer article of claim 1 further comprising a second outer layer on the opposite side of the inner layer for the first outer layer.

14. The multi-layer article of claim 1, wherein said substrate is plastic, metal, wood, glass, or stone.

15. The multi-layer article of claim 14, wherein said plastic substrate is selected from the group consisting of polyacrylonitrile-butadiene-styrene, polyacrylonitrile-styrene-acrylic, polycarbonate/polyacrylonitrile-butadiene-styrene, high impact polystyrene, polyvinyl chloride, thermoplastic olefins, polyolefins, polystyrene, polystyrene-acrylonitrile, polycarbonate, polyethylene terephthalate, and glycolised polyester.

16. The multi-layer article of claim 1, further comprising on the other side of the substrate from said inner and outer impact modified acrylic layers a second inner impact modified acrylic layer and then a second outer impact modified acrylic layer.

17. The article of claim 1 used as a flat sheet or formed by, in-mold decorating, blow molding, sheet forming, coextrusion, profile extrusion, or thermoforming.

18. The article of claim 1 comprising a spa; counter top; sink; bathtub liner and surround; automotive components; vehicle components; all-terrain and recreational vehicle components; body panels, tire cover, tonneau cover, cargo box, fender skirt, fifth wheel cover, lawn tractor components; engine surround cover; boat hull; computer housing; cell phone casing; and as a replacement for metal cladding in appliances.

* * * * *